# 2,798,867
Patented July 9, 1957

2,798,867

STEPWISE POLYMERIZATION OF DRIPOLENE FRACTIONS

Leon B. Gordon, Texas City, and Francis T. Wadsworth, Dickinson, Tex., assignors, by mesne assignments, to The American Oil Company No Drawing. Application October 20, 1953,
Serial No. 387,297

4 Claims. (Cl. 260—82)

This invention relates to synthetic resins and particularly to synthetic hydrocarbon resins. More specifically, our invention relates to the production of synthetic hydrocarbon resins from a mixture of unsaturated hydrocarbons, commonly known as "dripolene," obtained in the high-temperature pyrolysis of normally gaseous hydrocarbons.

A well-known raw material for the production of hydrocarbon resins is the complex mixture of unsaturated hydrocarbons produced by subjecting normally gaseous hydrocarbons to pyrolysis at elevated temperatures of 1300° F. or higher. At such temperatures, the hydrocarbons undergo a complex group of reactions, and are converted into a heterogeneous mixture which includes olefins, diolefins, cycloolefins, aromatics, and other constitutents of diverse physical and chemical properties. This mixture is commonly designated as "dripolene" in the art. The catalytic polymerization of dripolene or similar charging stocks has heretofore been carried out by a one-stage treatment of the dripolene or a fraction thereof in the presence of aluminum chloride, complexes of aluminum chloride, boron trifluoride, and the like. The resulting resins were found to be useful in a number of large-scale applications, but were in general handicapped because of certain shortcomings with respect to color, softening point, indentation characteristics, and the like.

We have now discovered an improved technique for producing resins of superior properties from dripolene. In our new process, dripolene is separated into two or more fractions by fractional distillation, and the fractions are polymerized one after the other with a boron trifluoride catalyst, the total catalyst being contacted first with the fraction of lowest unsaturation, and the successively more unsaturated fractions being thereafter added seriatim to the reaction mixture. In this way, the most difficultly polymerizable material is contacted first with an effectively high proportion of the catalyst in its most active form, and the more readily polymerizable materials are contacted with a lower concentration of catalyst of moderated activity. We have found that this technique produces a resin which, when formulated in mastic tiles, exhibits a lower degree of sensitivity to plasticizer concentration than resins produced by a single-stage polymerization. This is highly desirable property, since most hydrocarbon resins have narrow limits of tolerance for plasticizers and thereby make it necessary to employ rigidly controlled conditions in the utilization thereof.

It is accordingly an object of our invention to produce a hydrocarbon resin of improved chemical and physical properties. Another object is to prepare a useful resin from dripolene-type mixtures obtained in the pyrolysis of normally gaseous hydrocarbons. A further object is to minimize catalyst requirements in the polymerization of dripolene-type compositions. Another object is to prepare resins especially adapted to use in the fabrication of mastic tiles. These and other objects of our invention will be apparent from the following description thereof.

Dripolene is ordinarily prepared by high-temperature pyrolysis of a normally gaseous hydrocarbon containing two or more carbon atoms in the molecule, or a mixture of such hydrocarbons. The latter hydrocarbons are readily available in the form of natural gases and as by-product gases from the cracking of heavy petroleum oils in the manufacture of gasoline. In the preparation of dripolene, the gaseous hydrocarbon or mixture of hydrocarbons, preferably propane, a mixture of propane and propylene, or a natural gas rich in propanes and/or butanes is pre-heated and passed through an alloy tube in a furnace, where it is exposed at high space velocity to a pyrolysis temperature preferably between about 1350 and 1550° F. at a pressure up to about 100 pounds per square inch, preferably around 5 to 40 pounds per square inch gage. Best yields of liquid products of the dripolene type are realized when the time of exposure to the high temperature is limited to about 0.2 to 5 seconds, around 1 second being preferred.

The hot gases leaving the pyrolysis furnace are quenched with water, oil, or other cooling medium to a temperature below the pyrolysis level, preferably below about 100° F., in order to prevent further pyrolysis, polymerization, or degradation of the reaction product. From the quenching zone, the quenching liquid and a liquid mixture of unsaturated hydrocarbons are withdrawn, the latter being the desired dripolene composition. The dripolene is separated from the quenching liquid by stratification (where the two liquids are immiscible, as from water) or by distillation (as from an absorber oil). The quantity of liquid hydrocarbons produced in this way is ordinarily around 3 percent by weight of the total quantity of gas entering the pyrolysis reactor, the remainder of the gas being converted to hydrocarbons of lower molecular weight, such as ethylene, methane, and hydrogen. A typical specimen of dripolene has the following properties and composition:

ASTM distillation range, °F.:
  Initial _____ 100
  10% _____ 146
  20% _____ 162
  30% _____ 178
  40% _____ 188
  50% _____ 196
  60% _____ 206
  70% _____ 234
  80% _____ 296
  90% _____ 340
  Final _____ 360

Gravity, °API at 60° F_____ 34.7
Bromine number, cg. $Br_2$/g_____ 104.1
Maleic anhydride value, mg. M. A./g_____ 79
Index of refraction, $n^{25}_D$_____ 1.4830

Analysis, volume-percent:
  Propane and propylene _____ 0.7
  Isobutane _____ 0.1
  Isobutylene _____ 0.8
  1-butene _____ 0.5
  2-butene _____ 0.6
  n-Butane _____ 0.4
  Butadiene _____ 3.9
  Pentadienes _____ 7.7
  Pentylenes _____ 6.3
  Other $C_5$ _____ 0.4
  Benzene _____ 34.2
  Toluene _____ 7.8
  Xylenes _____ 1
  Styrene _____ 3
  Dicyclopentadiene _____ 5
  Other _____ 29.6

In the preparation of resins according to one embodiment of our invention, we distill from around 25 to 75 percent by volume of total dripolene as an overhead fraction, leaving behind the residual material as a distillation bottoms fraction. The said bottoms fraction may also be distilled if desired, suitably under vacuum, prior to being polymerized. Analysis of the said fractions indicates that the bottoms fraction is substantially less unsaturated than the distillate fraction, and is therefore less susceptible to the action of boron trifluoride polymerization catalysts. In accordance with our new technique, the more saturated bottoms fraction is treated first with the entire quantity of polymerization catalyst, followed by addition thereto and polymerization of the more unsaturated distillate fraction. This expedient results in the use of a high concentration of catalyst for polymerizing the more saturated fraction and a lower concentration of less active catalyst for the more reactive unsaturated fraction.

In another embodiment of our invention, the dripolene is divided into three or more fractions by fractional distillation, and the said fractions are contacted with the polymerization catalyst in the order of increasing unsaturation, as measured by their iodine number. Thus, in every case, the more difficultly polymerizable materials are contacted with a higher concentration of more active catalyst than in the succeeding polymerization step.

In the polymerization steps of our process, we employ a catalyst concentration of at least about 0.1 percent by weight, calculated as $BF_3$ on the basis of the total charging stock, and preferably between about 0.5 and 5 percent by weight. The catalyst is used in the form of anhydrous boron trifluoride or an active complex thereof with an aromatic hydrocarbon, a ketone, an alcohol, a carboxylic acid, or the like. Iodine may be added to the reaction mixture at one or more of the polymerization stages, preferably the first, for color improvement, suitably in a total proportion between about 0.01 and 2% by weight. The entire quantity of catalyst is initially combined in a suitable reaction vessel with (ordinarily) the highest-boiling dripolene fraction. The commingling of reaction components is best carried out with vigorous agitation at ordinary temperatures in a reaction vessel equipped with a jacket, cooling coils, or other indirect heat-exchange means, and agitation is preferably continued or resumed in each of the subsequent polymerization and charging-stock addition steps. Polymerization of the less saturated fraction or fractions can be carried out over a wide range of temperatures, for example at ordinary temperatures or at temperatures as high as 650° F. or above, optimally between about 300 and 650° F. A total contact time between about 0.1 and 1 hour is ordinarily sufficient for substantial completion of the exothermic polymerization reaction, although substantially longer treating times may be used if desired, particularly at the lower temperatures. The lower-boiling charging-stock fraction or fractions are then added, with or without a preliminary adjustment of the temperature of the reaction mixture, as desired, and after each such addition the reaction mixture is agitated and heated at a temperature of 300 to 650° F., preferably between about 500 and 650° F., until the polymerization reaction has reached the desired degree of completion, from 0.1 to 10 hours being ordinarily sufficient in each case. When the polymerization has been completed, the $BF_3$ is removed preferably by flashing or stripping at a temperature within the final polymerization range. The resulting organic mixture may be decolorized, if desired, by treatment with sulfuric acid or with clay, charcoal, silica, activated alumina, or other adsorbent solid. Thereafter, it is subjected to a stripping operation, suitably under vacuum, to remove the lower-boiling constituents, leaving the desired resin behind as a bottoms product.

The polymerization can optionally be carried out in an inert solvent for the final resin, such as a light petroleum naphtha, benzene, toluene, xylenes, isooctane, gasoline, or other aromatic or aliphatic hydrocarbon or mixture thereof. The use of such a solvent is especially desirable if the resin is to be subjected to decolorization before isolation from the reaction product, since the reaction product may be too viscous for convenient treatment in undiluted form with the decolorizing agent. The solvent is conveniently employed in a ratio between about 0.25 and 5 volumes per volume of total charging stock. The greater part of the solvent can readily be removed from the polymerization product by distillation, the residual portion being removed in the final stripping of the resin.

In one embodiment of our invention, total dripolene or dripolene distillate is subjected to a preliminary heat treatment at a temperature between about 350 and 650° F. in the absence of a catalyst for a period of 5 to 30 minutes or more. Thereafter, the dripolene is separated into fractions by distillation, and the said fractions are subjected to stepwise polymerization under the conditions described hereinabove. A resin of lighter color and of otherwise improved properties is obtained by this procedure.

In another embodiment, dripolene is separated into fractions by distillation, all or part of the fractions are subjected to a preliminary heat treatment at a temperature between about 350 and 650° F. in the absence of a catalyst for a period of 5 to 30 minutes or more, and the fractions are subjected to stepwise polymerization as set forth hereinabove.

The products of our invention are useful resins having superior properties with respect to softening point, color, viscosity, solubility in pentane, molecular weight, and indentation, compared with resins produced by the one-stage polymerization processes of the prior art. Our resins are especially desirable for blending with fillers and plasticizers in the fabrication of mastic floor tiles. The plasticizer in such tiles is commonly an air-blown limed tall oil, a lube oil extract, or the like, or a mixture thereof. In this application, our resins have the special advantage of low indentation sensitivity to plasticizer concentrations within the usual range of about 20 to 40 percent plasticizer.

Our invention will be more fully understood from the following specific examples, which illustrate the polymerization of dripolene and dripolene fractions with boron trifluoride according to a variety of procedures. In preparing the charging stocks, a quantity of dripolene of the type described above was fractionally distilled and between 80 and 85 volume-percent thereof was recovered as an overhead fraction. The said overhead fraction was thermally pretreated at 430° F. for approximately 17 minutes, yielding a material which will be referred to hereinafter as "thermally pretreated total dripolene distillate." A quantity of the said thermally pretreated total dripolene distillate was further fractionally distilled into a 0-50 volume-percent overhead fraction and a 50-100 volume-percent bottoms fraction. These fractions will be referred to hereinafter as the "0-50 percent fraction" and the "50-100 percent fraction."

*Example 1*

A quantity of the 50-100 percent fraction, referred to above, was polymerized by agitation with 6 percent by weight of $BF_3$ for one-half hour at ordinary temperatures. Thereafter, an equal volume of the 0-50 percent fraction, referred to above, was added, the mixture was heated to 550° F., and agitation was continued at that temperature for about one-half hour. It will be apparent that the total catalyst employed was approximately 3 percent by weight of $BF_3$, based on the total charging stock. The reaction product was cooled and the product resin was recovered by stripping catalyst and low boilers therefrom. The resin weighed 275 g., corresponding to a yield of 30.8 weight-percent. The resin was subjected to conventional tests, including formulation with a plasticizer in a mastic tile for indentation tests. The results are presented in the table below.

As a control, a quantity of the thermally pretreated total dripolene distillate, referred to above, was subjected to a single-step polymerization treatment with 3 weight-percent of $BF_3$ and 0.03 weight-percent of iodine. The boron trifluoride and iodine were added to the said distillate fraction at ordinary temperatures, and the mixture was agitated and heated for approximately one-half hour at 550° F. The reaction product was cooled and stripped to isolate the resin, and the resin was tested as set forth above. The product resin weighed 255 g., corresponding to a yield of 29.5 weight-percent.

From the comparative results of the above tests, presented in the following table, it is evident that the two-stage polymerization markedly decreases the sensitivity of the product resin to plasticizer concentration and improves the indentation characteristics of floor tiles formulated therefrom. In the one-step control run, as the plasticizer concentration in the tile was raised from 25 to 29 percent, the high-temperature indentation increased from 32 to 120 mils—an increment of 88 mils. In resins obtained by the two-stage polymerization, on the other hand, an equal change in plasticizer concentration increased the high-temperature indentation only 15 mils.

| Process | Two-step | | One-step | | |
|---|---|---|---|---|---|
| Softening point, °F | 288 | | 255 | | |
| Color, Cumar | 9 | | 5 | | |
| Iodine No | 45 | | 25 | | |
| Viscosity, Gardner [a] | Z-1 | | T-U | | |
| | | | | | |
| Plasticizer, wt.-percent | 31 | 35 | 25 | 29 | Spec. [b] |
| Indentation, mils: | | | | | |
| 77° F., 1 min | 3.8 | 4.8 | 4.5 | 14.8 | 7.0 |
| 77° F., 10 min | 7.0 | 9.8 | 6.8 | 35.0 | 11.7 |
| 115° F., 30 sec | 28.0 | 43.0 | 31.8 | 120.0 | 38.0 |

[a] As 70 percent solution in toluene.
[b] U. S. Government maximum indentation specifications for floor tiles.

Example 2

A quantity of the 50–100 percent fraction of thermally pretreated total dripolene distillate, described above, was commingled with 6 percent by weight of $BF_3$ and 0.06 percent by weight of iodine and agitated for one-half hour at ordinary temperature. The mixture was then heated to 550° F., held 0.25 hour, and cooled, and an equal quantity of the 0–50 percent fraction, described above, was added thereto. The total mixture was agitated one-half hour at ordinary temperature, heated to 595° F., held 0.25 hour, and then stripped. A product resin was obtained weighing 270 g., corresponding to a yield of 30.3 weight-percent, and having a softening point of 270° F., a Cumar color of 7, and a Gardner viscosity of W–X in a 70 percent solution in toluene. When the resin was formulated into a floor tile, a product of excellent high-temperature indentation properties was obtained:

| Plasticizer, wt.-percent | 31 | 34 |
|---|---|---|
| Indentation, mils: | | |
| 77° F., 1 min | 5 | 5.0 |
| 77° F., 10 min | 7.8 | 9.5 |
| 115° F., 30 sec | 24 | 36.5 |

Example 3

The following test shows the undesirability of reversing the order of polymerizing our 0–50 and 50–100 percent charging-stock fractions, described above. A quantity of the 0–50 percent fraction was commingled with 6 weight-percent of $BF_3$ and polymerized by agitation for one-half hour at ordinary temperature. An equal quantity of the 50–100 percent fraction was then added, and the mixture was heated and agitated at 575° F., for one-quarter hour. The reaction product was stripped and 270 g. of resin were recovered therefrom in a yield of 30.2 weight-percent. The resin had a softening point of 243° F, a Cumar color of 5, and a Gardner viscosity of X (70 percent in toluene). When formulated into tile with 29 percent of plasticizer, the resin was found to have very poor high-temperature indentation properties:

Indentation, mils
77° F., 1 min _____ 5.8
77° F., 10 min _____ 12.0
115° F., 30 sec _____ 52.0

Example 4

The following test further demonstrates the undesirability of reversing the order of our stepwise polymerization process. A quantity of the 0–50 percent fraction, described above, was commingled with 6 weight-percent of $BF_3$, agitated one-half hour at ordinary temperature, then heated with agitation for one-quarter hour at 575° F. The mixture was then cooled, an equal quantity of the 50–100 percent fraction was added, the total mixture was agitated one-half hour at ordinary temperature, then heated and agitated at 575° F. for one-quarter hour. The reaction product was stripped and 280 g. of resin were recovered therefrom in a yield of 31 weight-percent. The product resin had a softening point of 245° F., a Cumar color of 5, and a Gardner viscosity of V (70 percent in toluene). When formulated into tile with 30 percent of plasticizer, the resin exhibited inferior high-temperature indentation properties:

Indentation, mils
77° F., 1 min _____ 6.0
77° F., 10 min _____ 12.8
115° F., 30 sec _____ 47.8

Our product resins have the further advantage that, when formulated into tiles, they have greater indentation stability, as evidenced by a day-to-day comparison of the one-minute indentation at 77° F. In Example 1, for illustration, the one-step resin tile having an initial indentation of 14.8 mils increased to 29.0 mils after three days, while our two-step resin tile having an initial indentation of 4.8 increased to 10.3. In Example 2, our two-step resin tile having an initial indentation of 3.5 increased to 6.8 after three days.

While we have described our invention with reference to certain specific embodiments thereof, it is to be understood that such embodiments are illustrative only and not by way of limitation. Various modifications of our invention and alternative operating procedures, techniques, and conditions will be apparent from the foregoing description to those skilled in the art.

In accordance with the foregoing description, we claim as our invention:

1. In a method for preparing a hydrocarbon resin by polymerization of dripolene, a normally liquid mixture of unsaturated hydrocarbons obtained in the pyrolysis of a normally gaseous hydrocarbon having at least two carbon atoms in the molecule at a temperature between about 1300 and 1550° F. and a contact time between about 0.2 and 5 seconds, the improvement which comprises separating dripolene into at least two fractions of differing degrees of unsaturation by fractional distillation, contacting the least unsaturated fraction obtained thereby with a boron trifluoride polymerization catalyst under polymerization conditions until polymerization thereof is substantially complete, successively adding thereto the other dripolene fraction or fractions in order of increasing unsaturation and subjecting the resulting mixtures after each such addition to polymerization conditions until polymerization thereof is substantially complete, whereby a hydrocarbon resin is produced, and recovering the said resin from the reaction product.

2. In a method for preparing a hydrocarbon resin by polymerization of dripolene, a normally liquid mixture of unsaturated hydrocarbons obtained in the pyrolysis of a normally gaseous hydrocarbon having at least two carbon atoms in the molecule at a temperature between about 1300 and 1550° F. and a contact time between about 0.2 and 5 seconds, the improvement which comprises separating dripolene by fractional distillation into a lower-boiling first fraction consisting of from about 25 to 75 volume-percent of the said dripolene and a higher-boiling second fraction consisting of the remainder of the said dripolene, agitating the said second fraction with a boron trifluoride polymerization catalyst under polymerization conditions until polymerization thereof is substantially complete, then adding said first fraction to the reaction mixture and further agitating the said mixture under polymerization conditions to effect substantially complete polymerization thereof, separating said catalyst therefrom, and recovering a hydrocarbon resin from the reaction product.

3. In a method for preparing a hydrocarbon resin by polymerization of dripolene, a normally liquid mixture of unsaturated hydrocarbons obtained in the pyrolysis of a normally gaseous hydrocarbon having at least two carbon atoms in the molecule at a temperature between about 1300 and 1550° F. and a contact time between about 0.2 and 5 seconds, the improvement which comprises fractionally distilling dripolene into an overhead fraction consisting of about 25 to 75 volume-percent of the said dripolene and a bottoms fraction consisting of the remainder of the said dripolene, agitating said bottoms fraction with above about 0.1 percent by weight of $BF_3$ at a temperature up to about 650° F. until polymerization thereof is substantially complete, adding thereto said overhead fraction and further agitating at a temperature between about 300 and 650° F. until the polymerization thereof is substantially completed, flashing $BF_3$ therefrom at a temperature between about 300 and 650° F., and recovering a synthetic hydrocarbon resin from the resulting organic layer by stripping low boilers therefrom.

4. In a method for preparing a hydrocarbon resin by polymerization of dripolene, a normally liquid mixture of unsaturated hydrocarbons obtained in the pyrolysis of a normally gaseous hydrocarbon having at least two carbon atoms in the molecule at a temperature between about 1300 and 1550° F. and a contact time between about 0.2 and 5 seconds, the improvement which comprises thermally pretreating dripolene at a temperature between about 350 and 650° F. for about 5 to 30 minutes, separating the pretreated dripolene by fractional distillation into an overhead fraction containing between about 25 and 75% thereof and a bottoms fraction consisting of the remainder thereof, commingling the resulting bottoms fraction at ordinary temperatures with between about 0.5 and 5 percent by weight of $BF_3$, based on said bottoms fraction, agitating the resulting mixture at a temperature between about 300 and 650° F. until the polymerization thereof is substantially complete, thereafter adding said overhead fraction thereto and further agitating at a temperature between about 500 and 650° F. until the polymerization is substantially complete, flashing $BF_3$ from the resulting reaction product at a temperature between about 500 and 650° F., and recovering a hydrocarbon resin by stripping low boilers therefrom.

References Cited in the file of this patent

UNITED STATES PATENTS

| | | |
|---|---|---|
| 2,023,495 | Thomas | Dec. 10, 1935 |
| 2,100,900 | Fikentscher | Nov. 30, 1937 |
| 2,234,660 | Thomas | Mar. 11, 1941 |
| 2,583,504 | Young | Jan. 22, 1952 |